Jan. 31, 1928.
W. H. HOLMES
1,657,471
INDEX DEVICE
Filed Sept. 28, 1923
3 Sheets-Sheet 1
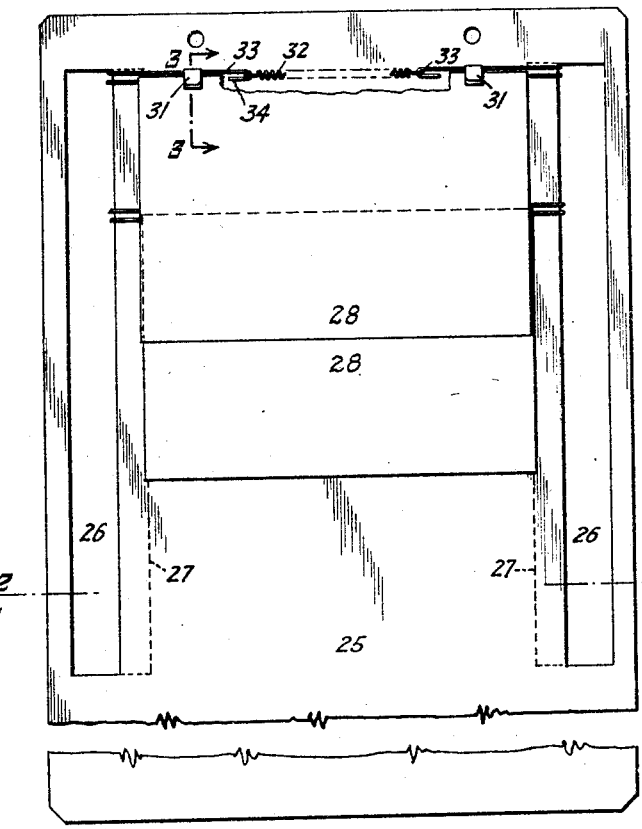
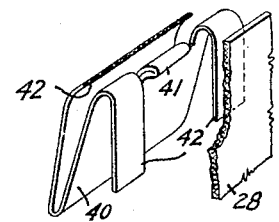
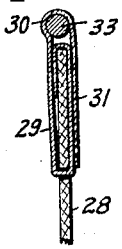
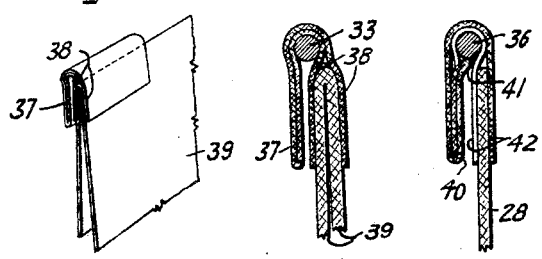
INVENTOR
William H. Holmes
BY
Duell, Warfield & Duell
ATTORNEY Jan. 31, 1928. 1,657,471
W. H. HOLMES
INDEX DEVICE
Filed Sept. 28, 1923 3 Sheets-Sheet 2
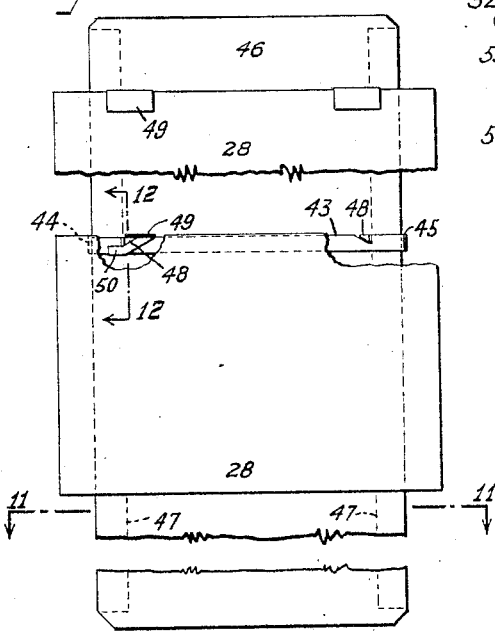
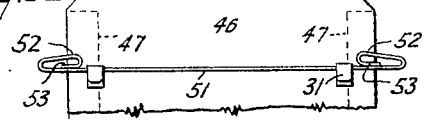
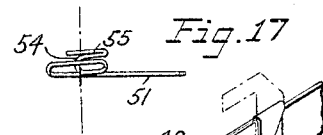
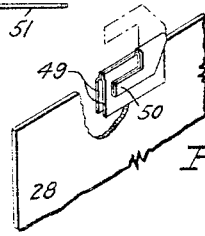
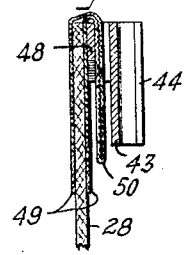
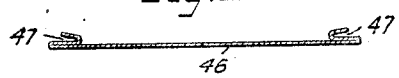
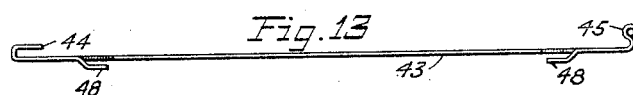
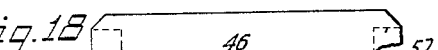
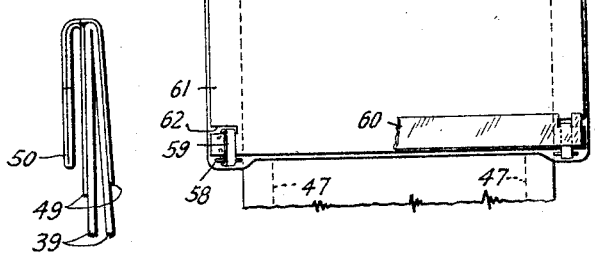
INVENTOR
William H. Holmes
BY
Duell, Warfield & Duell
ATTORNEY Jan. 31, 1928.
W. H. HOLMES
1,657,471
INDEX DEVICE
Filed Sept. 28, 1923
3 Sheets-Sheet 3
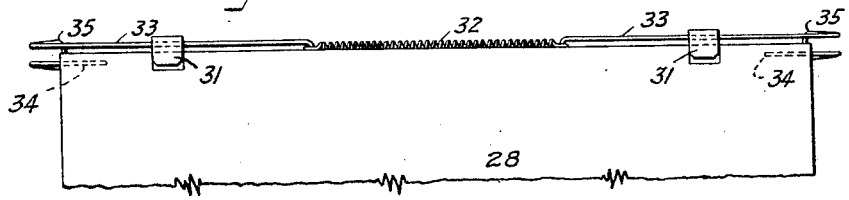
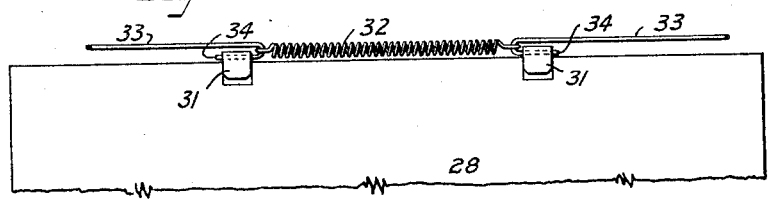
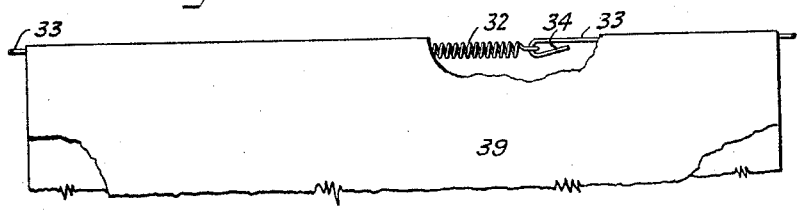
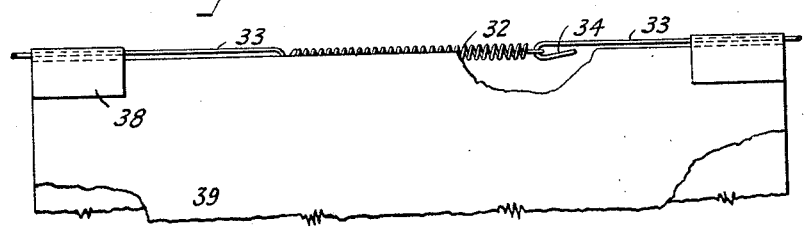
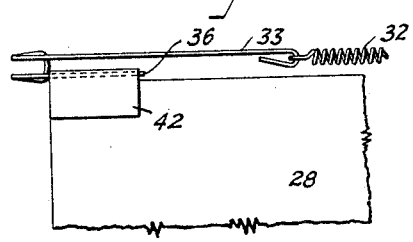
INVENTOR
William H. Holmes
BY
Duell, Warfield & Duell.
ATTORNEY Patented Jan. 31, 1928.

1,657,471

UNITED STATES PATENT OFFICE.

WILLIAM H. HOLMES, OF MOUNT VERNON, NEW YORK.

INDEX DEVICE.

Application filed September 28, 1923. Serial No. 665,503.

This invention relates to index devices and with respect to its more specific features, to what is commonly known as a visible index.

It is an object of the present invention to provide an improved device of the character stated in which a series of cards are mounted upon a suitable supporting element such as a backing sheet, this mounting being accomplished preferably by the use of supporting members.

It is a further object of the invention to furnish an index device in which the parts will be so retained with respect to each other as to virtually preclude their being accidentally detached.

A still further object resides in the construction of an article of the type aforementioned in which all of the parts may be readily detached from each other, if it is desired to do so, aside from the fact that in using the construction of the present invention each of the cards may readily be inspected, all sides of the same being available for the reception of data.

Another object is that of furnishing an index device in which the parts are of extremely simple construction and consequently capable of quantity and economical production so that all objections in this connection are avoided.

Still another object is to be predicated to the designing of a device in which certain of the parts heretofore liable to be damaged, will be protected.

Other objects of the invention will be in part obvious and in part pointed out hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Figure 1 is a face view of an index device embodying the improved construction of the present invention, Fig. 2 is a sectional plan view taken along the line 2—2 and in the direction of the arrows indicated in Fig. 1.

Fig. 3 is a fragmentary transverse sectional view taken along the line 3—3 in the direction of the arrows also indicated in Fig. 1, Fig. 4 is an elevation of one form of the card-supporting members which may be employed in connection with the device, Fig. 5 is a perspective view of the clip as shown in Fig. 3 and prior to its application to the supporting member or card, Fig. 6 is a perspective view of a form of clip which may also be used to advantage in certain instances, Fig. 7 is an enlarged fragmentary sectional view of the device as shown in Fig. 6 and illustrating the same as applied to a supporting member, Fig. 8 is a perspective view of a different form of clip than that shown in Figs. 6 and 7, Fig. 9 is an enlarged sectional view of the clip shown in Fig. 8 and illustrating the same as applied to a card and to a supporting member, Fig. 10 is a view similar to Fig. 1 but shows a slightly different form of backing sheet, supporting member and mode of attachment of the card to the supporting member, Fig. 11 is a sectional plan view taken on the line 11—11 and in the direction of the arrows indicated in Fig. 10, Fig. 12 is an enlarged fragmentary transverse sectional view taken along the line 12—12 and in the direction of the arrows also indicated in Fig. 10, Fig. 13 is an elevation of the supporting member as utilized in connection with the construction illustrated in Fig. 10, Fig. 14 is a perspective view of the rear of the card with one of the clips as utilized in Fig. 10 applied thereto, Fig. 15 is an end view of a clip similar to that shown in Fig. 14 but illustrating the same in association with a double card, Fig. 16 is a face view of a backing sheet with still another form of supporting member associated therewith, Fig. 17 is a fragmentary perspective view of the supporting member as shown in Fig. 16, Fig. 18 is a face view of still another form of index device including a different type of supporting member, cards and clips.

Fig. 19 is a perspective view of the supporting member utilized in connection with the construction shown in Fig. 18, and Figs. 20, 21, 22, 23 and 24 are views each showing a portion of a card applied to a supporting member of that type generally illustrated in Figs. 1 and 4 but in each instance depicting a different manner of applying the card to the said supporting member.

In the first embodiment illustrated, it will be seen, referring particularly to Figs. 1 and 2, that the reference numeral 25 indicates a backing sheet of any desirable material, which is formed in the present instance, with cutout portions 26. Adjacent the inner edges of each of these cutout portions the removed material of the backing sheet is bent upon itself to extend flush against the rear face of the sheet and has its edge bent to extend in an opposite direction thus providing members in the nature of grooved rails 27, the purpose of this construction being hereafter brought out.

The index cards forming a part of the device may be of any suitable type such as for example, a single sheet of material 28, which is attached to a suitable supporting member hereinafter described. This attachment may be provided by utilizing clips of the type illustrated, for example in Figs. 3 and 5, in which it will be seen that a strip 29 of suitable material, such as for example metal, has been employed which has one of its ends bent upon itself to provide a hook-shaped portion, its opposite end being extended in the form of a loop, and a portion 31 lying flush against the outer face of the shank of the hook portion of the first end. Thus, it will be understood, as has been clearly shown in Fig. 3, that the strip may be passed through an opening formed in the card 28 and be disposed in such a manner with respect thereto that the rectangular portion of the clip thus provided snugly embraces the card between the opening and edge thereof while the loop portion 30 of the clip passes around a supporting member of suitable type, the outer end of the strip serving to prevent any accidental disengagement of the clip from the said supporting member.

An attaching member of this nature may be applied to a supporting member of any desirable type and may be associated with any convenient portion thereof; for example, the supporting member may take the form illustrated in Figs. 1 and 4 in which it will be noted that the same includes three major parts. The center of these parts may be in the nature of a coil spring 32 which has its outer ends looped one around the inner end of each of the outer portions. Both of these outer portions, aside from being intended for use in engagement with the opposite edges of the backing sheet, are similar to each other and include a body 33 having an inturned inner end 34 which is connected with one of the ends of the spring 32 as afore brought out. The outer end of each of these portions is preferably bent to provide a hook 35 which for the purpose of stability may be relatively broad.

These hook portions are now brought to have their outer ends extend into the grooves formed in the rails 27 of the backing sheet, so that the supporting members, together with the cards carried thereby, are attached to the backing sheet as has been clearly brought out in Fig. 1. In this connection attention is invited to the fact that each of the rails 27 has an outer wall as shown in Fig. 2, so that the outer ends of the supporting members, when the latter are applied to the backing sheet, will be partially housed and fully protected against mutilation such as would occur if the backing sheet were not constructed in this manner. It will be appreciated, attention being invited to Figs. 1, 20, and 21 to 24, that the clips securing the cards to the supporting members may be associated with any desired portion thereof. For example as in Figs. 1 and 20, the clips are shown as encircling the bodies 33 of the outer parts of the supporting members, while in Fig. 21 the clips encircle the outwardly extending portions of the hook-shaped inner end thereof. In Figure 22, the record card is associated with a supporting member therefor by extending the body of this card around the member. In Figure 23 the clips are shown as disposed adjacent the outer edges of the cards and are of the type shown in Figures 6 and 7. Finally, as in Fig. 24, the clips, may, if desired, be attached to the inwardly extending portions of the outer ends of the parts of the supporting member aforementioned.

Obviously, when the parts are assembled in the manner shown in Fig. 1, each of the cards 28 is supported in such a manner that the cards in advance thereof may be swung to a position at which the face of the card in question is visible in its entirety for the purpose of inspection or the application thereto of additional data. The same is true of the rear face of the card and if it is desired to remove the card from the supporting member which carries the same, this may readily be accomplished by simply moving the card with respect to the supporting member so that the body of the latter rides between the rectangular portion of the clip and the outer part 31 thereof until the card is free from the supporting member. If, however, an operator is desirous of removing the supporting member, this may in turn be readily accomplished by simply moving the two outer parts thereof away from each other until the hook portion 35 of one or both of the same is fully retracted from its position within the groove 27 subsequent to which this end or both ends of the supporting member may be moved through the cutout parts 26 in order to accomplish the result desired. If now the card is associated with the supporting member in the manner shown in Figs. 1 and 20, it will be understood that this operation of the parts will not result in a detachment of the card from the supporting member. On the other hand, if the clips engage the supporting member in the manner indicated in Fig. 21, the inherent tendency of the spring 32 to move the outer parts of the supporting members towards each other will result in the outturned portions 34 of the inner ends thereof being retracted from within the loops of the clips so that a detaching of the supporting member from the backing sheet and permitting of the parts of the former to assume their normal position, will automatically release the card therefrom. Finally, if the clips engage the supporting member as in Fig. 24, it will be understood that due to the fact that the inwardly extending portions 36 at the outer ends of the supporting member are preferably each longer than the hook portions 35 thereof, the expansion of the supporting member in detaching the same from the backing sheet, will not result in disengagement of the card therefrom, while the subsequent release of the supporting member will merely cause each of the outer parts thereof to move towards each other, this movement being limited incident to the stops provided by the engagement of the bent portions with the clips.

It is obvious that any desirable type of clip may be employed, as for example in lieu of the metallic clips heretofore referred to, a clip formed of a suitable fabric may be utilized which, as has been shown in Figs. 6 and 7, is simply a strip of fabric bent upon itself to form a rigid hook portion 37, the ends of this strip being separated as at 38 and engaging the faces of a card in the manner shown, for example, in Figs. 6-7. In the event that it is found that a clip of this character does not engage a supporting member in a sufficiently tenacious manner, it will be seen that the construction of the same may be altered, as for example to that shown in Figs. 8 and 9, in which a strip of similar fabric has been utilized but has been bent to provide a hook portion 40 which has its outer end inturned to provide an offset part 41, a certain portion or portions of this strip being continued to extend substantially parallel to the body thereof and to engage as at 42, for example, opposite faces of the card 28, these engaging parts corresponding in function to that of the parts 38.

It will be obvious that, if desired, the flexible clips illustrated for example in Figs. 6 to 9 inclusive, may be substituted for the metallic clips in the various associations named and in fact, if desired, the clips may be entirely dispensed with in using a double card, i. e., a card folded upon itself, in that a card of the 39 type may be simply folded around the supporting member as in Fig. 22 and in this position be adequately supported aside from the fact that all of its various faces are accessible for inspection and the application of data thereto.

If it is found, due to manufacturing costs or other reasons, that a supporting member of the type aforedescribed is not desirable in certain instances, the same function may be accomplished by utilizing for example, a supporting member as in Fig. 13, which embraces a flat strip of material 43 incorporating resilient qualities and having one of its ends bent to form a hook 44, its opposite end being slightly inturned as at 45. A supporting member of this type may be applied to a backing sheet of the character illustrated in Figs. 1 and 2 or, if desired, the same may be applied to a backing sheet 46 which is formed with no cutout portions but in which the ends of the supporting member directly engage the outer edges of the backing sheet, it being understood that the material of this sheet may be bent adjacent these edges to provide rails 47 corresponding in construction and function to the rails provided by the grooves 27. In using a supporting member of the type shown in Fig. 13, it will be understood that a card may be applied thereto in any desirable manner, as for example by associating with the latter, clips of the type shown in Figs. 14 and 15. These clips may each include a pair of portions 49 extending one to each side of the card face and in intimate engagement therewith, the outer ends of the clips in this instance being in the form of tongues 50, extending towards the center portion of the card and capable of application one to each of the tongues 48 in the manner best shown in Figs. 10 and 12. The supporting member with the card attached thereto in any desired manner, or prior to the attachment of the card may now have its hook end 44 brought to extend around one of the edges of the backing sheet and its body swung to a position parallel to the face of the sheet, at which point, due to the inherent resiliency of the strip, the inturned end 45 thereof will snap past the opposite edge of the backing sheet thus securing the card in position. It is to be understood in this connection, that if a supporting member of the type last described is used, that a further advantage is derived in that when the card is affixed to the same and the supporting member is in turn applied to the backing sheet, none of the parts of the supporting member are visible, as has been clearly brought out in Fig. 10.

Still another form of supporting member is shown in Figs. 16 and 17, this type of device possessing the same advantages as those which may be attributed to the type of supporting members shown in Fig. 13 and possessing the further quality of being constructed of wire. More particularly, it will be noted, that this supporting member includes a body 51 which has each of its ends bent to extend upwardly and inwardly as at 52; downwardly and outwardly as at 53; rearwardly as at 54 and terminating in a hook portion 55. Thus, the part 52 of this supporting member bears against the front face of the backing sheet 46, while the rearwardly extending portion 54 of the said member extends across and engages the edge of the sheet, the hook portion 55 thereof bearing against the rear face of the sheet and serving to prevent accidental detachment. In removing the attaching or supporting member from the backing sheet, an operator simply finds it necessary to grasp the outermost portions of the body 51 and to swing the same so that they extend at an obtuse angle with respect to each other at which point, due to the relatively short length of the hook portions 55, the latter may be swung past the edges of the sheet 46 to thus permit of the attachment or removal of the supporting member.

Finally, it will be understood that in the interest of economy or for any other desired reason, a supporting member may be utilized such, for example, as has been shown in Fig. 19. This member embraces a body 56 having hook shaped ends 57 corresponding to the ends 35 of the first described supporting member. This device may be applied to the backing sheet simply by passing the former over one of the ends of the latter in such manner that the edges of the sheet come to lie in the crotch of the hooks 57. Also, it is to be understood that in Fig. 18, which illustrates the last described position of the parts, each or any of the cards aforementioned may carry a second card simply by securing to the cards staples 58 which serve to attach hook strips 59 thereto, these strips in turn engaging or forming a part of a strip mounting 60 providing a pocket for one edge of a supplemental card 61 which may be notched as at 62 to accommodate the hook strips, its opposite edge preferably extending below the tongue or outer end portion 31, of clips of the character shown in Figs. 3 and 5, so that all of the parts are normally retained properly applied with respect to each other although these parts may readily be moved or completely detached one from the other.

It will also be apparent, reference being had to Fig. 18, that if desired the supporting member 56 may be of such material that it presents substantially rigid properties, while the supporting sheet 46 may be flexible, it being understood that if this is the case, the parts may be separated or applied to each other simply by flexing the latter and moving the supporting member towards or away from the backing sheet.

From the foregoing, it will be obvious that among others, the various objects afore enumerated are accomplished and it will be understood that since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. An index device including, in combination, a backing sheet formed with cutout portions, and a supporting member having parts extending through said cutout portions and engaging one of the edges thereof.

2. An index device including, in combination, a backing sheet formed with cutout portions, and a supporting member having parts extending through said cutout portions and engaging one of the side edges thereof.

3. An index device including, in combination, a backing sheet formed with cutout portions, and a supporting member having parts extending through said cutout portions and engaging the outwardly facing side edges thereof.

4. An index device including, in combination, a supporting member comprising a plurality of parts, each including a body and outwardly extending inner end portions and inwardly extending outer end portions, a card, and means attached to said card and engaging said supporting member for attaching said card and member one to the other.

5. An index device, including a support having opposite and outwardly-extending grooved rails and a card-supporting member extending across said support, and inwardly-extending end portions forming parts of said member and entering the grooves of said rails.

6. An index device, including a support having opposite and outwardly-extending edge portions, and a card-supporting member extending across said support, said member including a body and hook-shaped end portions extending around said edges and substantially parallel to its body.

7. An index device, including a support, and a card-supporting member associated therewith, said member including a body comprising a plurality of parts, certain of said parts engaging said support, another of said parts consisting of a spring cooperating with said first-named parts to prevent relative movement of said card member and said support.

8. An index device, including a support, and a card-supporting member associated therewith, said member comprising a pair of end elements having their outer ends hook-shaped to engage portions of said support, and their inner ends being also hook-shaped, and a spring extending between and connected with said inner ends to maintain the outer ends in cooperating engagement with said support.

9. An index device, including a clip comprising a relatively broad body of strip material bent to provide a hook-shaped end portion engaging a card, a loop portion beyond said end portion and accommodating a card-supporting member, and an end beyond said loop portion and extending substantially flush against the other face of the shank of said hook portion.

In testimony whereof I affix my signature.

WILLIAM H. HOLMES.